March 1, 1966 W. PALMER 3,238,450

SIGNAL AMPLITUDE AND PHASE SYNTHESIZING APPARATUS

Filed Oct. 22, 1962

INVENTOR.
WINSLOW PALMER
BY Robert J. Haase
ATTORNEY

United States Patent Office 3,238,450
Patented Mar. 1, 1966

3,238,450
SIGNAL AMPLITUDE AND PHASE SYNTHESIZING APPARATUS

Winslow Palmer, Amityville, N.Y., assignor to Sperry Rand Corporation, Great Neck, N.Y., a corporation of Delaware Filed Oct. 22, 1962, Ser. No. 232,009
6 Claims. (Cl. 324—83)

Figure 1:
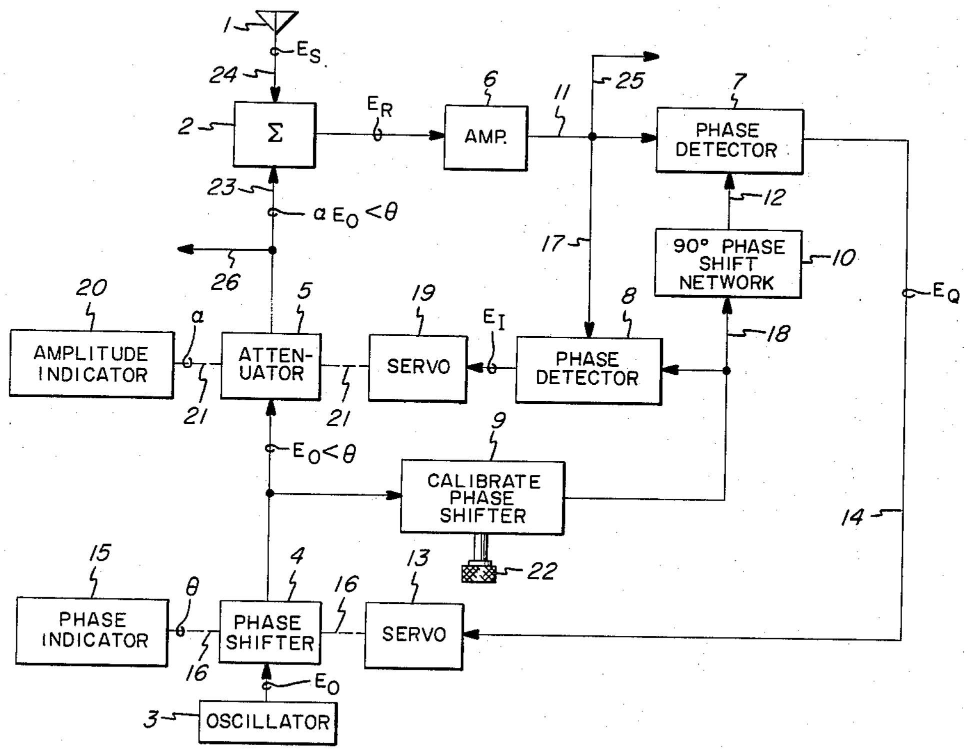

The present invention generally relates to signal sources adapted to produce a replica signal whose amplitude and phase characteristics are precisely determined by those of a received signal. More particularly, the invention is concerned with such a signal source arranged so that its own amplitude and phase characteristics do not detract from the accuracy of the replica signal.

Techniques are known in the art for producing a local signal having a phase approximating the phase of a received signal and for producing a local signal having an amplitude approximating the amplitude of the received signal. Such techniques, have been employed, for example, in apparatus for measuring the phase of a received signal and for measuring the amplitude of a received signal.

In the case of the phase measuring technique, it is conventional to provide a source of local signal having a frequency substantially the same as the frequency of a received signal. Controllable phase shifting means also are provided to shift the phase of the local signal. The phase shifted local signal and the received signal are applied to a phase detector to produce an error signal representing the phase difference between the two. The error signal, in turn, sets the phase shifter in such a sense and by such an amount as to reduce the error signal toward zero thereby bringing the phase shifted local signal and the received signal into a predetermined phase relationship at their respective inputs to the phase detector. The phase of the received signal (relative to the phase of the local signal) can be deduced from the setting of the phase shifter required to bring about the predetermined phase relationship.

It is also conventional to determine the amplitude of a received signal by providing a calibrated source of local signals of known amplitude and applying the calibrated local signal and the received signal at separate times to the same amplitude indicating device. When the response of the indicating device to the calibrated signal is substantially identical to its response to the received signal, the amplitude of the received signal can be read from the calibration of the local signal source required to effect the aforementioned identical response. In the measurement of the phase and amplitude of a received signal in accordance with the prior art techniques alluded to, however, the measurement indications are subject to error as a function of the phase and amplitude or gain variations that might occur in the measuring apparatus itself. Such variations enter directly into the respective phase and amplitude indications.

It is the principle object of the present invention to provide signal amplitude and phase synthesizing apparatus for producing a local signal whose amplitude and phase are precisely determined by those of a received signal substantially free of errors attributable to the amplitude and phase characteristics of the synthesizing apparatus.

Another object is to provide apparatus for accurately measuring the amplitude of a received signal without error due to the amplitude characteristic of the measuring apparatus.

A further object is to provide apparatus for measuring the phase of a received signal without error due to the phase characteristic of the measuring apparatus.

An additional object is to provide apparatus for cancelling a single frequency component of a received signal without substantially effecting other components of different frequencies which may be present in the received signal.

These and other objects of the present invention, as will appear from a reading of the following specification, are achieved in a preferred embodiment by the provision of means for receiving an incoming signal and for obtaining the phasor difference between the received signal and a locally generated signal of the same frequency whose amplitude and phase are controlled in a special manner. The phasor difference signal is amplified and then applied to a pair of phase detectors which also receive the local signal. Provision is made so that a predetermined one of the phase detectors produces a first output signal related to the component of the phasor difference signal which is in phase quadrature with the local signal. The other phase detector produces a second output signal related to the component of the phasor difference signal which is in phase with the local signal. The first output signal is applied to the local source to control the phase of the local signal. The second output signal is applied to the local source to control the amplitude of the local signal.

In effect, two closed servo loops are formed for controlling the phase and the amplitude of the local signal in accordance with the quadrature and in-phase components, respectively, of the phasor difference signal. The action is such that the phase and the amplitude of the local signal are accurately matched to the phase and amplitude of the received signal to a degree of accuracy which is a direct function of the forward gain of the servo loops, i.e., the higher the gain, the greater the accuracy. The phase and amplitude of the received signal free of equipment errors may be determined by measuring the phase and amplitude, respectively, of the local signal.

It is to be noted that the received signal component having a phase and amplitude matching those of the local signal is effectively cancelled at the output of the circuit in which the phasor difference signal is derived. In the event that the received signal includes other components having different phase and amplitude characteristics, such as components having frequencies different from the frequency of the local signal, such other components are substantially unaffected. The action may be likened to that of an ideal signal rejecting filter which blocks a predetermined component of particular phase and amplitude but freely passes other signal components which may be present having other phase and amplitude characteristics.

Figure 2:
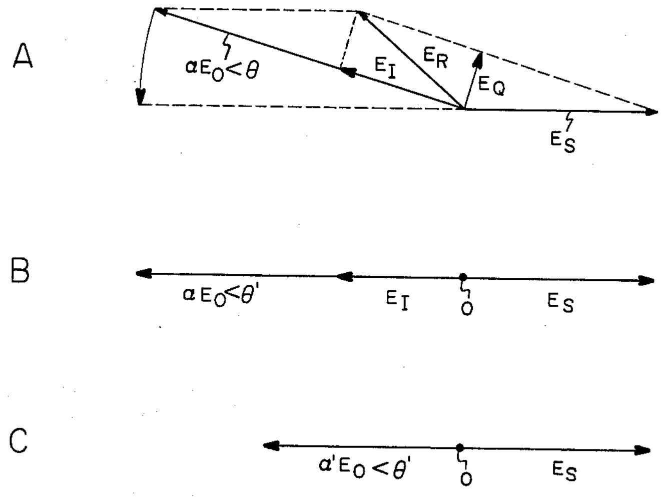

For a more complete understanding of the present invention, reference should be had to the following specification and to the drawings of which:

FIG. 1 is a simplified block diagram of a preferred embodiment;

And FIG. 2 is a series of phasor diagrams useful in explaining the operation of FIG. 1.

Referring to FIG. 1, antenna 1 receives an incoming signal of known frequency but of unknown phase and amplitude. The received signal is applied to a first input of linear summing network 2 which may be a conventional linear resistive summing network. Network 2 also receives a signal derived from oscillator 3 and applied via phase shifter 4 and attenuator 5. The phase and amplitude of the signal are adjusted by means of phase shifter 4 and attenuator 5, respectively, in a manner to be described later.

Summing circuit 2 produces an output signal representing the phasor difference between the received signal and the adjusted (local) signal at the respective inputs of the network. The phasor difference signal is applied by amplifier 6 jointly to phase detectors 7 and 8. The local signal at the output of phase shifter 4 is applied via calibrate phase shifter 9 directly to a second input of phase detector 8 and, by a 90° phase shifter network 10, to a second input of phase detector 7. Inasmuch as phase detectors 7 and 8 are driven by local signals in phase quadrature, each detector responds to a respective quadrature component of the amplified phasor difference signal appearing on line 11.

The output signal produced by phase detector 7 has an amplitude and sense representing the amount of phase shift and the sense of phase shift, if any, between the signals appearing on lines 11 and 12. Said output signal is applied to servo 13. Servo 13, in turn, positions shaft 16 and phase shifter 4 in a sense corresponding to the sense of the signal on line 14. The setting of phase shifter 4 is displayed by phase indicator 15 which is also driven by shaft 16.

Similarly, phase detector 8 produces an output signal having an amplitude and sense representing the amount of the phase difference and the sense of phase difference, if any, between the input signals appearing on lines 17 and 18. Said output signal drives servo 19 in a corresponding sense to position shaft 21 and attenuator 5. The setting of attenuator 5 is displayed by amplitude indicator 20 driven by shaft 21.

An understanding of the operation of the disclosed embodiment will be facilitated by reference to the phasor diagrams of FIG. 2. The incoming signal received by antenna 1 is designated $E_S$ and the signal generated by oscillator 3 is designated $E_0$. The later signal is phase shifted by phase shifter 4 and attenuated in amplitude by attenuator 5 to yield the resultant local signal represented by the phasor $\alpha E_0\angle\theta$. The angle $\theta$ represents the phase difference between the signal at the output of oscillator 3 and the signal at the output of phase shifter 4. The factor $\alpha$ represents the attenuation introduced by attenuator 5. It is assumed that an initially arbitrary phase and amplitude relationship exists between the received and local signals applied to summing network 2 as suggested by the phasor $E_S$ and $\angle E_0\angle\theta$ in FIG. 2A. The function of the apparatus of FIG. 1 is twofold. First, the phase of the local signal is adjusted by the output signal produced by phase detector 7 into a 180° relationship with respect to the received signal $E_S$ as shown in FIG. 2B. Second, the amplitude of the local signal is adjusted by the output signal produced by phase detector 8 to be equal to the amplitude of the received signal $E_S$ as indicated in FIG. 2C.

It is preferred that the apparatus of FIG. 1 be adjusted in a manner now to be described before an attempt is made to match the phase and amplitude characteristics of the local signal to those of the received signal. In the calibration mode, servo 19 is disabled by any conventional means (not shown) so that the position of attenuator 5 be made non-responsive to the output of phase detector 8. It is also necessary, that the incoming signal received by antenna 1 be prevented from reaching summing network 2 as by opening up the transmission line connecting antenna 1 to network 2. Under these circumstances, only the local signal $\alpha E_0\angle\theta$ is applied to the input of amplifier 6. The calibrate phase shifter 9 is adjusted by means of knob 22 to bring the signals on lines 11 and 12 into substantially a phase quadrature relationship with respect to each other. The attainment of the desired phase quadrature relationship, whereby the phase shift of phase shifter 4 is made substantially equal to the inherent phase shift of amplifier 6, is evidenced by the occurence of a null at the output of phase detector 7. Shaft 16, driven by servo 13 ceases to rotate when the output of detector 7 goes to a null. It will be observed that the phase quadrature relationship will be preserved irrespective of any changes in the setting of phase shifter 4, inasmuch as the phase shift of the local signal $E_0\angle\theta$ remains unchanged in passing through the circuit branch comprising attenuator 5, network 2 and amplifier 6 and in passing through the network branch comprising phase shifter 9 and network 10 to reach the respective inputs to phase detector 7. Upon the completion of the above-described calibration operation, the incoming signal received by antenna 1 is applied to network 2 and servo 19 is restored to normal operation.

In the absence of a local signal, a typical incoming signal received by antenna 1 would be described by the phasor $E_S$ of FIG. 2A at the input of amplifier 6. In the absence of a received signal, a typical local signal would be described by the phasor $\alpha E_0\angle\theta$ at the input of amplifier 6. Actually, however, both signals normally are present whereby the phasor difference signal represented by the phasor $E_R$ is produced at the output of circuit 2 and applied to amplifier 6.

It will be noted that the phasor difference signal $E_R$ may be considered as comprising two orthogonal components $E_Q$ and $E_I$. The component $E_Q$ is in phase quadrature with the local signal phasor $\alpha E_0\angle\theta$ whereas the component $E_I$ is in phase with the local signal phasor $\alpha E_0\angle\theta$ as shown in FIG. 2A. As a result of the calibrate operation described above, phase detector 7 exclusively responds to the quadrature component $E_Q$ while phase detector 8 exclusively responds to the in-phase componets $E_I$. The output signal produced by phase detector 7, corresponding to the quadrature component $E_Q$, is applied to servo 13 to position phase shifter 4 in the appropriate sense. The positioning of phase shifter 4 rotates the phasor $\alpha E_0\angle\theta$ of FIG. 2A to assume the position shown in FIG. 2B relative to the received signal $E_S$. The phasor rotation results in the elimination of the quadrature component $E_Q$ whereby the signal on line 14 reduces to zero and the shaft of phase shifter 4 becomes stationary.

The remaining (in-phase) component of the signal on line 11 at the output of amplifier 6 is detected in phase detector 8. Detector 8 produces an output signal representing said component $E_I$ to drive servo 19 and attenuator 5 in a sense tending to reduce the amplitude of the component toward zero. The reduction to zero of the amplitude of component $E_I$ results in the phasor relationship depicted in FIG. 3C wherein the phase of the signal $\alpha' E_0\angle\theta'$ appearing on line 23 is at 180° with respect to the phase of the signal $E_S$ appearing on line 24 and the amplitude of the signal $\alpha' E_0\angle\theta'$ is equal to the amplitude of the signal $E_S$.

To briefly summarize, the apparatus of FIG. 1 produces a local signal having a phase and amplitude precisely determined by the phase and amplitude of the received signal $E_S$. This result is achieved by obtaining the phasor difference between the local signal and the received signal and by adjusting the phase and amplitude of the local signal in accordance with the components of the phasor difference signal which are in quadrature and in phase, respectively, with the local signal. The phase and amplitude adjustments of the local signal are achieved by means of two servo loops which share a common amplifier 6. The phase adjusting servo loop comprises amplifier 6, phase detector 7, servo 13, phase shifter 4, attenuator 5 and summing circuit 2. The amplitude adjusting servo loop comprises amplifier 6, phase detector 8, servo 19, attenuator 5 and summing circuit 2. The two servo loops operate to reduce the phasor difference signal $E_R$ to zero to a degree of precision determined by the forward gain of the servo loop, i.e., the gain of amplifier 6 and the gains of the amplifiers, if any, that may be utilized in servo 13 and 19. The larger the gain (short of causing servo instability as is well understood in the art), the nearer the phasor difference signal $E_R$ approaches zero. By definition, the nearer the phasor difference signal $E_R$ approaches zero, the more exactly the phase of the local signal $\alpha' E_0\angle\theta'$ will match the phase of $E_S$ and the nearer its amplitude will equal the amplitude of $E_S$.

It will be observed that only the received signal component $E_S$ will be cancelled at the output of summing circuit 2 by the local signal $\alpha' E_0\angle\theta'$. In the event that the received signal contains other components of phase and amplitude characteristics different than those of said local signal (such as components having frequencies different than the frequency of the local signal), such other components freely pass through summing circuit 2 and are amplified by amplifier 6. Thus, the present invention provides for the substantially total elimination of a particular component of a band of received signals similar to the action of an ideal signal rejecting filter that might be desired in applications where it is important to reject a single continuous wave interfering signal which might be present with desired signals. The desired signals are available at output lead 25 to the exclusion of the interfering signal which is cancelled by local signal in circuit 2.

Other uses of the present invention include the measurement of the amplitude of a single incoming signal ($E_S$) of known frequency and the measurement of the phase of a single incoming signal ($E_S$) of known frequency. The amplitude of the incoming signal is displayed by indicator 20 whereas the phase of the incoming signal is displayed by indicator 15. In every case, however, the disclosed technique of adjusting the amplitude and phase of the signal provided by oscillator 3 in accordance with the orthogonal components of the phasor difference signal developed by summing circuit 2 imparts a high degree of accuracy for the result desired. That is, the amplitude and phase data displayed by indicators 20 and 15, the amplitude and phase characteristics of the replica signal on line 26, and the degree of cancellation of the received signal at the output of network 2 are precisely determined to a degree which is a direct function of the gain of amplifier 6 and the gains of the amplifiers, if any, that may be utilized in servos 13 and 19.

While the invention has been described in its preferred embodiments, it is understood that the words which have been used are words of description rather than of limitation and that changes within the purview of the appended claims may be made without departing from the true scope and spirit of the invention in its broader aspects.

What is claimed is:

1. Apparatus for producing a phase shifted first signal whose phase and amplitude are determined by the phase and amplitude of a second signal, said second signal having any unrestricted initial phase relation with respect to said phase shifted first signal, said apparatus comprising
- a source of said first signal,
- first means coupled to said source for phase shifting said first signal in response to a first control signal,
- second means coupled to said first means for attenuating the phase shifted signal in response to a second control signal,
- means coupled to receive the phase shifted and attenuated signal and said second signal to produce a phasor difference signal,
- means coupled to receive said difference signal and said phase shifted signal to produce said first control signal representing the component of said difference signal which is in phase quadrature with said phase shifted signal,
- said first control signal being applied to said first means whereby said phase shifted first signal is brought into a predetermined phase relation with respect to said second signal irrespective of said initial phase relation,
- and means coupled to receive said difference signal and said phase shifted signal to provide said second control signal representing the component of said difference signal which is in phase with said phase shifted signal,
- said second control signal being applied to said second means.

2. Apparatus as defined in claim 1 and further including means for indicating the phase of said first signal.

3. Apparatus as defined in claim 1 and further including means for indicating the amplitude of said first signal.

4. Apparatus for cancelling a single frequency component of a received signal without substantially affecting other components of difference frequencies which may be present in said received signal, said apparatus comprising
- a source of a local signal having a frequency substantially the same as the frequency of said single frequency component and having any unrestricted phase relation with respect to said single frequency component,
- first means coupled to said source for phase shifting said local signal in response to a first control signal,
- second means coupled to said first means for attenuating the phase shifted local signal in response to a second control signal,
- means coupled to receive the phase shifted and attenuated local signal and said received signal to produce a phasor difference signal,
- means coupled to receive said difference signal and said phase shifted signal to produce said first control signal representing the component of said difference signal which is in phase quadrature with said phase shifted signal,
- said first control signal being applied to said first means whereby said phase shifted local signal is brought into a predetermined phase relation with respect to said single frequency component irrespective of said phase relation between said local signal and said single frequency component,
- and means coupled to receive said difference signal and said phase shifted signal to produce said second control signal representing the component of said difference signal which is in phase with said phase shifted signal,
- said second control signal being applied to said second means.

5. Apparatus for producing a phase shifted first signal whose phase and amplitude are determined by the phase and amplitude of a second signal, said second signal having any unrestricted initial phase relation with respect to said phase shifted first signal, said apparatus comprising,
- a source of said first signal,
- first means for phase shifting said first signal in response to a first control signal,
- second means for attenuating said first signal in response to a second control signal,
- said first means and said second means being serially coupled to said source,
- means coupled to receive said second signal and the phase shifted and attenuated signal provided by said serially coupled first and second means to produce a phasor difference signal,
- means coupled to receive said difference signal and said phase shifted signal to produce said first control signal representing the component of said difference signal which is in phase quadrature with said phase shifted signal,
- said first control signal being applied to said first means whereby said phase shifted first signal is brought into a predetermined phase relation with respect to said second signal irrespective of said initial phase relation,
- and means couplied to receive said difference signal and said phase shifted signal to produce said second control signal representing the component of said difference signal which is in phase with said phase shifted signal,
- said second control signal being applied to said second means.

6. Apparatus for cancelling a single frequency component of a received signal without substantially affecting other components of different frequencies which may be present in said received signal, said apparatus comprising a source of a local signal having a frequency substantially the same as the frequency of said single frequency component and having any unrestricted phase relation with respect to said single frequency component, first means for phase shifting said local signal in response to a first control signal, second means for attenuating said local signal in response to a second input signal, said first means and said second means being serially coupled to said source, means coupled to receive said received signal and the phase shifted and attenuated signal provided by said serially coupled first and second means to produce a phasor difference signal, means coupled to receive said difference signal and said phase shifted signal to produce said first control signal representing the component of said difference signal which is in phase quadrature with said phase shifted signal, said first control signal being applied to said first means whereby said phase shifted signal is brought into a predetermined phase relation with respect to said single frequency component irrespective of said phase relation between said local signal and said single frequency component, and means coupled to receive said difference signal and said phase shifted signal to produce said second control signal representing the component of said difference signal which is in phase with said phase shifted signal, said second control signal being applied to said second means.

References Cited by the Examiner

UNITED STATES PATENTS

| | | | |
|---|---|---|---|
| 2,911,592 | 11/1959 | Colker et al. | 324—83 |
| 2,921,261 | 1/1960 | King et al. | 324—83 |
| 2,946,004 | 7/1960 | Frank | 324—83 |
| 2,995,699 | 8/1961 | Snelling et al. | 324—57 |
| 3,001,133 | 9/1961 | Boscia | 324—83 |

WALTER L. CARLSON, *Primary Examiner.*

JAMES W. LAWRENCE, *Examiner.*